United States Patent [19]
Gibson

[11] Patent Number: 5,871,568
[45] Date of Patent: Feb. 16, 1999

[54] RETURN CIRCUIT FOR VAPOR RECOVERY SYSTEM

[75] Inventor: David L. Gibson, Louisville, Ky.

[73] Assignee: Jordan Technologies, Inc., Fisherville, Ky.

[21] Appl. No.: 978,853

[22] Filed: Nov. 26, 1997

Related U.S. Application Data

[63] Continuation of Ser. No. 668,527, Jun. 21, 1996, abandoned.

[51] Int. Cl.⁶ .......................... B01D 53/04; B01D 53/14
[52] U.S. Cl. .................... 96/122; 96/130; 96/144; 96/157; 96/245; 96/265; 96/278
[58] Field of Search ................. 95/24; 96/121, 96/122, 130, 133, 134, 144, 157, 170, 244, 245, 265, 278; 137/386, 395; 261/27, 37

[56] References Cited

U.S. PATENT DOCUMENTS

| | | | |
|---|---|---|---|
| 2,187,646 | 1/1940 | Darrieus ..................................... | 95/261 |
| 2,604,185 | 7/1952 | Johnstone et al. ......................... | 95/219 |
| 2,764,178 | 9/1956 | Paul et al. ............................ | 137/386 X |
| 2,853,149 | 9/1958 | Gosselin .................................... | 96/168 |
| 2,919,766 | 1/1960 | Dillman et al. ........................ | 95/146 X |
| 3,011,966 | 12/1961 | Jahnentz .................................... | 208/81 |
| 3,183,645 | 5/1965 | Teller ..................................... | 95/92 X |
| 3,266,262 | 8/1966 | Moragne ..................................... | 62/54 |
| 3,282,027 | 11/1966 | Johnson et al. ............................. | 95/21 |
| 3,320,756 | 5/1967 | Hashemi ..................................... | 62/45 |
| 3,349,546 | 10/1967 | Rogers .................................. | 96/265 X |
| 3,385,029 | 5/1968 | de Vries .................................... | 95/220 |
| 3,714,790 | 2/1973 | Battey ..................................... | 62/48.2 |
| 3,763,901 | 10/1973 | Viland ..................................... | 95/24 X |
| 3,771,317 | 11/1973 | Nichols ..................................... | 62/54 |
| 3,830,040 | 8/1974 | Hendrix ............................... | 62/48.2 X |
| 3,830,074 | 8/1974 | Nichols ................................... | 62/48.2 |
| 3,867,111 | 2/1975 | Knowles .................................... | 95/21 |
| 3,972,201 | 8/1976 | Datis ........................................ | 62/54 |
| 4,066,423 | 1/1978 | McGill et al. .............................. | 95/92 |
| 4,074,984 | 2/1978 | Führing .................................... | 96/114 |
| 4,077,789 | 3/1978 | Edwards ................................... | 62/48.2 |
| 4,110,996 | 9/1978 | Thompson ................................ | 62/48.2 |
| 4,197,095 | 4/1980 | White, Jr. et al. .................... | 96/112 X |
| 4,235,829 | 11/1980 | Partus ................................... | 137/386 X |
| 4,259,975 | 4/1981 | Kinsey, Jr. et al. ................. | 137/386 X |
| 4,276,058 | 6/1981 | Dinsmore .................................... | 95/93 |
| 4,279,628 | 7/1981 | Wymer et al. ............................. | 55/238 |
| 4,283,212 | 8/1981 | Graham et al. ........................ | 95/115 X |
| 4,331,456 | 5/1982 | Schwartz et al. ........................... | 95/93 |
| 4,338,101 | 7/1982 | Tuttle ........................................ | 95/93 |
| 4,343,629 | 8/1982 | Dinsmore et al. .......................... | 95/93 |

(List continued on next page.)

FOREIGN PATENT DOCUMENTS

| | | | |
|---|---|---|---|
| 362005007 | 2/1987 | Japan ...................................... | 96/113 |
| 405228322 | 9/1993 | Japan ...................................... | 96/113 |
| 1666165 | 7/1991 | U.S.S.R. .................................. | 96/113 |

OTHER PUBLICATIONS

Kappa GI; Vapor Recovery Units DWG 920–15; Brochure (undated).

Dinsmore, Harold L.; "Excessive Carbon Bed Temperatures"; Service Bulletin 11; Jul. 6, 1993.

*Primary Examiner*—Robert Spitzer
*Attorney, Agent, or Firm*—King and Schickli

[57] ABSTRACT

An absorber fluid return circuit is provided for a volatile liquid vapor recovery system. The vapor recovery system includes at least one adsorbent bed for capturing volatile liquid vapor, a vacuum pump for regenerating the adsorbent bed, an absorber tower for condensing volatile liquid vapor and an absorber fluid source. The absorber fluid return circuit includes an absorber fluid return pump having an inlet and outlet and a first conduit for directing absorber fluid from the absorber tower to the inlet of the return pump. A second conduit directs absorber fluid from the outlet of the return pump to the absorber fluid source. A variable speed motor drives the return pump. The variable speed motor is controlled by a controller operatively connected to a sensor for sensing the level of absorber fluid in the absorber tower, a variable speed AC drive for varying the speed of the drive motor.

4 Claims, 2 Drawing Sheets

U.S. PATENT DOCUMENTS

| | | | |
|---|---|---|---|
| 4,350,018 | 9/1982 | Frank et al. | 62/54 |
| 4,351,649 | 9/1982 | Owens et al. | 96/110 |
| 4,380,091 | 4/1983 | Lively | 137/386 X |
| 4,388,276 | 6/1983 | Konstantouros et al. | 137/386 X |
| 4,462,811 | 7/1984 | Dinsmore et al. | 95/26 |
| 4,480,393 | 11/1984 | Flink et al. | 34/27 |
| 4,539,019 | 9/1985 | Koch | 95/19 |
| 4,569,207 | 2/1986 | James | 62/235.1 |
| 4,596,586 | 6/1986 | Davies et al. | 95/261 |
| 4,660,586 | 4/1987 | Knapp et al. | 137/386 X |
| 4,670,028 | 6/1987 | Kennedy | 95/92 |
| 4,682,549 | 7/1987 | Hall | 110/345 |
| 4,711,647 | 12/1987 | Gathmann | 96/157 X |
| 4,714,483 | 12/1987 | Koening et al. | 96/113 |
| 4,715,868 | 12/1987 | Kennedy | 95/94 |
| 4,857,084 | 8/1989 | Robbins et al. | 95/97 |
| 4,963,168 | 10/1990 | Spencer | 96/122 |
| 5,006,138 | 4/1991 | Hewitt | 62/18 |
| 5,017,240 | 5/1991 | Brown | 62/48.2 X |
| 5,076,822 | 12/1991 | Hewitt | 62/48.2 X |
| 5,078,573 | 1/1992 | Peroaho et al. | 415/169.1 |
| 5,125,935 | 6/1992 | Nakaya et al. | 95/98 |
| 5,154,735 | 10/1992 | Dinsmore et al. | 95/92 |
| 5,176,002 | 1/1993 | O'Brien et al. | 62/48.2 |
| 5,187,131 | 2/1993 | Tiggelbeck et al. | 502/34 |
| 5,240,481 | 8/1993 | Li et al. | 96/109 |
| 5,256,171 | 10/1993 | Payne | 95/24 X |
| 5,269,833 | 12/1993 | Nitsche | 95/93 |
| 5,294,246 | 3/1994 | Gardner, Sr. | 95/15 |
| 5,345,771 | 9/1994 | Dinsmore | 62/18 |
| 5,389,125 | 2/1995 | Thayer et al. | 95/11 |
| 5,426,945 | 6/1995 | Menzenski | 62/11 |
| 5,480,475 | 1/1996 | Tuttle | 96/122 |
| 5,515,686 | 5/1996 | Jordan | 96/126 |
| 5,584,911 | 12/1996 | Menzenski | 96/130 X |
| 5,591,254 | 1/1997 | Gibson | 96/122 X |

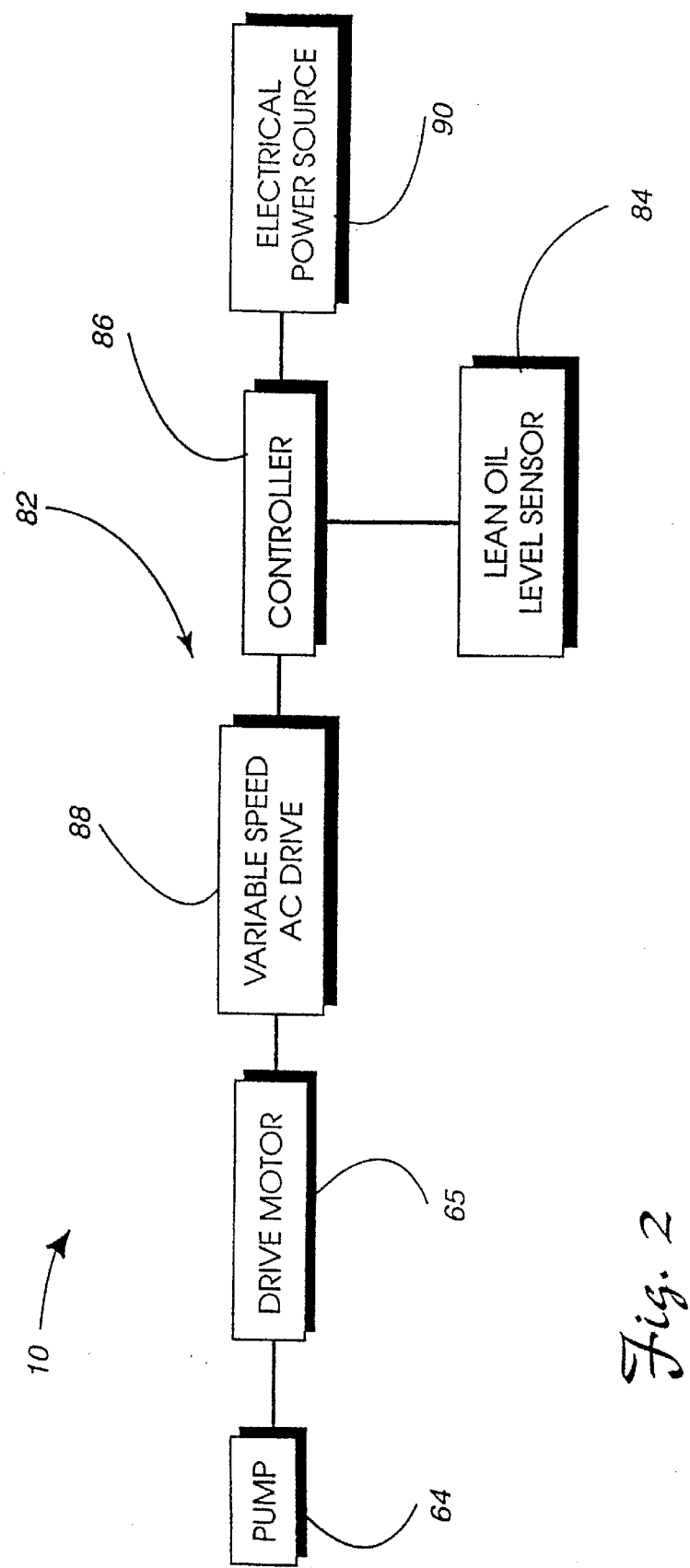

5,871,568

RETURN CIRCUIT FOR VAPOR RECOVERY SYSTEM

This is a continuation, of application Ser. No. 08/668,527, filed JUN. 21, 1996, now abandoned.

TECHNICAL FIELD

The present invention relates generally to the field of volatile liquid vapor recovery and, more particularly, to an apparatus and a method for improving the efficiency of a combined adsorption/absorption tower vapor recovery system.

BACKGROUND OF THE INVENTION

When handling volatile liquids such as hydrocarbons including gasoline and kerosene, air-volatile liquid vapor mixtures are readily produced. The venting of such air-vapor mixtures directly into the atmosphere results in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the recovered volatile liquids are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings, alternative technology was sought and adsorption/absorption vapor recovery systems were more recently developed. Such a system is disclosed in a number of U.S. Patents including, for example, U.S. Pat. No. 4,276,058 to Dinsmore, the disclosure of which is fully incorporated herein by reference. Such systems utilize a bed of solid adsorbent selected, for example, from silica gel, certain forms of porous mineral such as alumina and magnesia, and most preferably activated charcoal. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

It should be appreciated that the bed of adsorbent used in these systems is only capable of adsorbing a certain amount of hydrocarbons before reaching capacity and becoming ineffective. Accordingly, the bed must be periodically regenerated to restore the carbon to a level where it will effectively adsorb hydrocarbons again. This regeneration of the adsorbent is a two step process.

The first step requires a reduction in the total pressure by pulling a vacuum on the bed that removes the largest amount of hydrocarbons. The second step is the addition of a purge air stream that passes through the bed. The purge air polishes the bed so as to remove substantially all of the previously adsorbed hydrocarbons. These hydrocarbons are then pumped to an absorber tower wherein an absorber fluid such as lean oil or other nonvolatile liquid solvent is provided in a countercurrent flow relative to the hydrocarbon rich air-hydrocarbon mixture being pumped from the bed. The absorber fluid condenses and removes the vast majority of the hydrocarbons from that mixture and the residue gas stream from the absorber tower is recycled to a second bed of adsorbent while the first bed completes regeneration.

In order to achieve the most effective and efficient recovery of hydrocarbon from the hydrocarbon rich air-hydrocarbon mixture, it is necessary to maintain a particular level of absorber fluid during absorber tower operation. In the past this has been accomplished using a level control valve and float assembly arrangement. While such an arrangement is effective for its intended purpose, it does suffer from a number of shortcomings.

First, it should be appreciated that dirt and rust, elements commonly found in the operating environment of most vapor recovery systems, tend to foul the operation of the level control valve and float assembly. Further, in cold weather conditions moisture and condensation contacting the level control valve and float assembly may freeze effectively preventing these components from properly operating and maintaining the necessary level of absorber fluid in the absorber tower to provide efficient operation.

Second, it should be appreciated that many state of the art float assemblies incorporate diaphragms made from a resilient material such as polytetrafluoroethylene. Unfortunately, this material stiffens in cold weather conditions thereby impairing proper function. Further, many hydrocarbon fuel additives in use today chemically attack the material from which the diaphragms are constructed thereby necessitating frequent maintenance intervals for replacement and repair (perhaps as often as quarterly in northern climates subject to greater temperature extremes).

Many other state of the art float assemblies incorporate piston arrangements in place of diaphragms. It should be appreciated, however, that these piston arrangements must include sealing rings. The same hydrocarbon fuel additives noted above for chemically attacking diaphragms, chemically attack the materials from which these piston rings are constructed. Such chemical attack often leads to ring swelling and disconfiguration that impairs proper float assembly operation. Accordingly this type of construction also nessitates frequent maintenance intervals for replacement and repair. The resulting downtime substantially reduces loading terminal productivity. Further, repairs may be unexpectedly required thereby interrupting delivery schedules and creating other significant inconveniences.

Third, it should be noted that the level control valve is a purely mechanical device and as such is subject to constant wear. In particular, most level control valves incorporate a needle valve that becomes worn over time. Eventually this wear leads to a leaking condition that necessitates repair and further down time.

A need is, therefore, identified for a new and improved approach for controlling the level of absorber fluid in the absorber tower during vapor recovery system operation.

SUMMARY OF THE INVENTION

Accordingly, it is a primary object of the present invention to provide an improved apparatus for the recovery of volatile liquids from an air-volatile liquid vapor mixture overcoming the above-described limitations and disadvantages of the prior art.

Another object of the present invention is to provide an apparatus for the recovery of volatile liquids from an air-volatile liquid vapor mixture wherein significant increases in overall productivity are provided by increasing maintenance intervals and thereby reducing downtime. Advantageously, this is accomplished without any substantial increases in the capital cost of the equipment, using a relatively simple and inexpensive arrangement that may even be readily retrofitted to vapor recovery systems in the field.

Still another object of the present invention is to equip the absorber tower of a vapor recovery system with a variable speed drive return pump that maintains the desired level of absorber fluid in the absorber tower to maximize absorber tower efficiency. Advantageously this design arrangement eliminates the need for a level control valve and float assembly commonly employed in prior art vapor recovery systems. As a result, more reliable system performance is provided and overall loading terminal productivity is enhanced.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved absorber fluid system circuit is provided for a volatile liquid vapor recovery system including at least one adsorbent bed, a vacuum pump for regenerating the bed, a heat exchanger for cooling the vacuum pump, an absorber tower for condensing the volatile liquid vapor and an absorber fluid source. The absorber fluid return circuit includes an absorber fluid return pump having an inlet and an outlet. A first conduit connects the inlet of the return pump to a discharge outlet on the absorber tower. A second conduit connects the outlet of the return pump to the absorber fluid source or storage tank.

The absorber fluid return circuit also includes a motor for driving the return pump at different speeds and, accordingly, different return flow rates. Additionally, a means is provided for controlling the operating speed of the motor in response to the level of absorber fluid contained in the absorber tower. This is done in order to maintain the necessary amount of absorber fluid in the absorber tower to provide efficient and effective operation thereof so as to optimize hydrocarbon recovery.

Preferably, the control means comprises a controller such as a dedicated microprocessor, an absorber fluid level sensor and a variable speed AC drive for varying the electrical frequency of the current to the drive motor in response to the level of absorber fluid sensed or detected in the absorber tower.

In accordance with still another aspect of the present invention, a volatile liquid vapor recovery system is provided. More specifically, the volatile liquid vapor recovery system includes at least one adsorbent bed, a vacuum pump for regenerating the bed, an absorber tower for condensing volatile liquid vapor, an absorber fluid source and the absorber fluid return circuit just described.

Advantageously, this volatile liquid vapor recovery system provides more reliable and dependable performance over a longer service life. More specifically, the unique absorber fluid return circuit eliminates many component parts including the level control valve and float assembly are commonly employed on state of the art equipment in the field and that require periodic replacement. Accordingly, down time is reduced and productivity for a loading terminal equipped with the present invention may be substantially increased.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a detailed block diagram schematic of the control system for the absorber fluid return circuit of the present invention.

Figure 1:
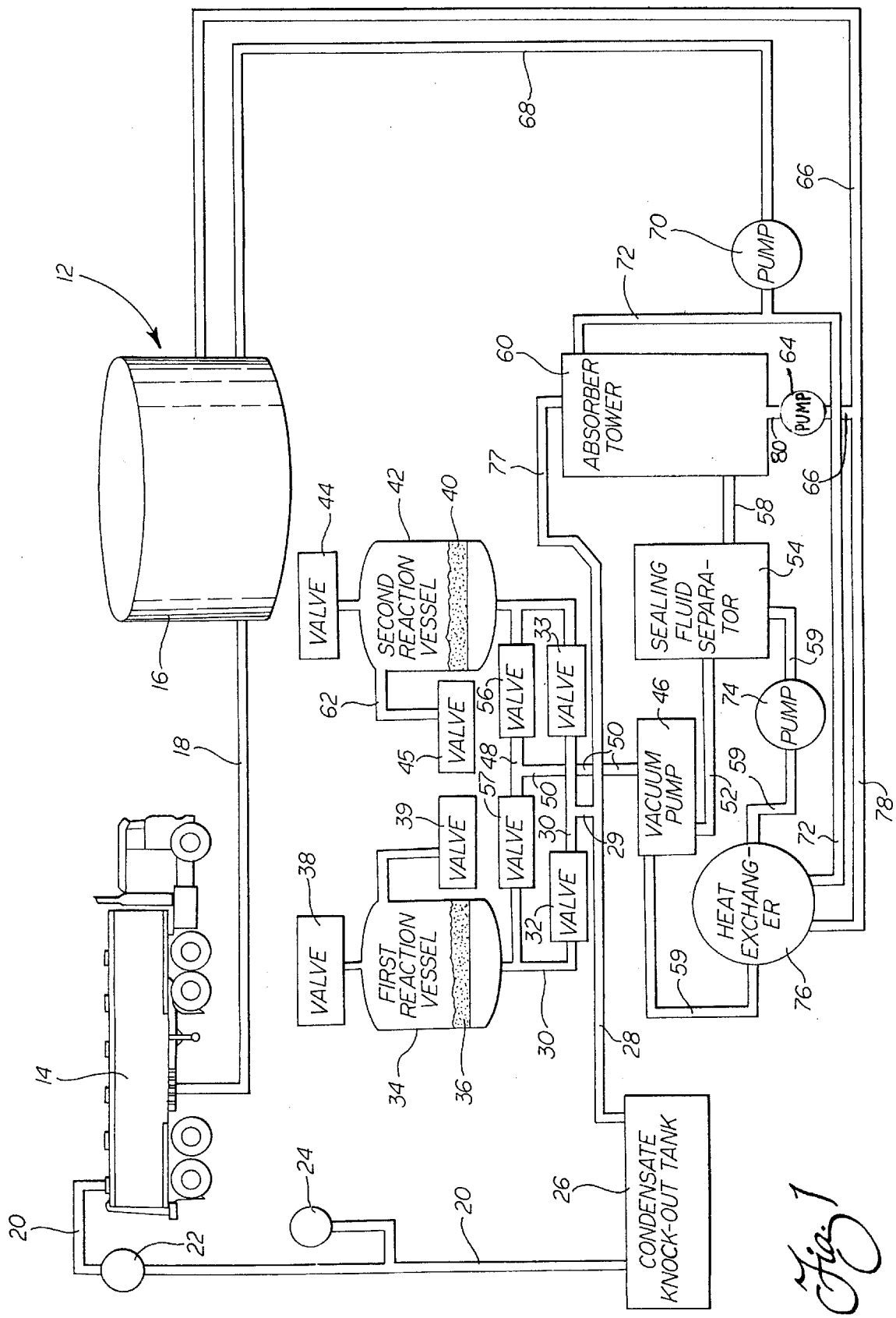
FIG. 1 is a schematical diagram showing a volatile liquid recovery system incorporating the improved absorber fluid return circuit of the present invention.

Reference will now be made in detail to the present preferred embodiment of the invention, an example of which is illustrated in the accompanying drawing.

DETAILED DESCRIPTION OF THE INVENTION

Reference is now made to FIGS. 1 and 2 showing the absorber fluid return, circuit 10 of the present invention incorporated into a liquid vapor recovery system, generally designated by reference numeral 12. As will become apparent as the description hereof proceeds, the absorber fluid return circuit 10 functions to significantly enhance the profitability and productivity of the adsorption/absorption vapor recovery system 12 by significantly extending maintenance intervals, lowering maintenance costs and increasing operating efficiency. The vapor recovery system 12 is generally of the type disclosed and described in U.S. Pat. No. 4,066,423 to McGill et al. and U.S. Pat. No. 5,515,686 to Jordan, and entitled "Absorber Fluid Circuit for Vapor Recovery System" the disclosures of which are fully incorporated herein by reference.

As shown the vapor recovery system 12 is particularly suited to the recovery of vaporized hydrocarbons of the type expelled from trucks, tank cars and other vessels 14 as they are loaded with hydrocarbons from a storage tank 16 through a feed line 18. More particularly, those vapors are collected as an air-hydrocarbon vapor mixture in a collection line 20, attached to the truck 14 and delivered past a vapor check valve 22 and pressure/vacuum vent 24 to a condensate knock-out tank 26. From there, the air-hydrocarbon vapor mixture passes along the lines 28, 29 and 30 past open valve 32 (valve 33 is closed) to the first reaction vessel 34 including a first bed of absorbent 36. The bed 36 adsorbs the volatile hydrocarbon vapors and clean air is exhausted past the valve 38 into the environment, valve 39 being closed.

Simultaneously, the adsorbent bed 40 in the second reaction vessel 42 is being regenerated: that is, the capacity of the bed 42 to adsorb vapor is being renewed. To achieve this end, valves 44 and 45 are initially closed and the vacuum pump 46 is operated to pull a vacuum on the bed 40 in the second reaction vessel 42. Generally, as is known in the art, a liquid ring, two-stage vacuum pump having a capacity of 100–2000 cfm is utilized for this purpose. Such a pump may, for example, be obtained from Graham Vacuum Pump of Batavia, N.Y. (e.g. Model 2V7240).

As the pump 46 draws the vacuum down in the reaction vessel 42 to 22–28 inches of mercury vacuum, a mixture of air and volatile liquid vapor is pulled from the bed 40. This mixture is directed by the pump 46 through conduits 48, 50, 52 into the sealing fluid separator 54 by operation of the valve 56 (open) and the valve 57 (closed). The sealing fluid separator 54 separates the pump sealing fluid, required for proper operation of the liquid ring, two-stage vacuum pump 46, from both the condensed volatile liquids that are recovered and the air-vapor mixture that is directed through conduit 58 to the absorber tower 60. The sealing fluid recovered from the separator 54 is recirculated by pump 74 through the lines 59 to the vacuum pump 46 by way of the heat exchanger 76 which receives cooling lean oil from the storage tank 16 via feed lines 68 and 72 by means of the pump 70. Following heat exchange, the lean oil is returned to the storage tank 16 via lines 78 and 66. In this way the operative temperature of the vacuum pump 46 is controlled to provide better operating efficiency.

Toward the end of the regeneration cycle, (e.g. when a specific vacuum level is reached or for a specific time such as the last one to two minutes of an approximately 10–17 minute cycle), a small quantity of purge air is introduced into the reaction vessel 42 by opening valve 45. This purge air is drawn from the ambient atmosphere through line 62 and is passed through the bed 40 to polish the absorbent clean of the remaining hydrocarbons. During this process it should be appreciated that the purge air is only introduced into the bed 42 at a rate sufficient to substantially maintain a pressure of approximately 22–28 and more preferably 25–27 inches of mercury vacuum. The purge air and the last of the hydrocarbons is also directed by the pump 46 through the separator 54 and conduit 58 to the absorber tower 60.

As is known in the art, the absorber tower 60 provides a countercurrent flow of absorber fluid such as lean oil by means of a dispersal sprayer (not shown). This lean oil is provided from the storage tank 16 via feed lines 68 and 72 by means of the supply pump 70. The absorber fluid serves to condense the volatile liquid vapors from the air-volatile liquid vapor mixture drawn from the reaction vessel 42 by the pump 46 as just described.

The condensed hydrocarbons and absorber fluid are preferably collected from the bottom of the absorber tower 60 by operation of an absorber fluid return pump 64 driven by a motor 65 (see also FIG. 2) and then delivered via conduit 66 through a one-way flow control valve (not shown) to the storage tank 16. Preferably, the pump 64 is a ANSI pump such as manufactured by Ingersoll-Dresser, capable of pumping between 25–200 gallons per minute. The sizing of the pump 64 and motor 65 depends upon the head pressure in the gasoline storage tank 16 and the desired pump or flow rate. A more detailed description of the absorber fluid return circuit 10 including the pump 64 and motor 65 will be found below.

The residue air that exits from the absorber tower 60 is largely free of volatile liquid vapor. It, however, is preferably recirculated or recycled for introduction into the first reaction vessel 34 via the conduits 77 and 30. In this way, any residual volatile liquid vapor may be captured in the bed 36 to complete the cleaning of the air prior to exhausting into the environment past valve 38.

Of course, as is well known in the art it should be appreciated that the reaction vessels 34 and 42 are essentially identical and that the operation thereof may be reversed as required to provide for continuous processing. This means that when the bed 36 is saturated, the bed 36 may be regenerated in the manner described above with reference to the bed 42 while the bed 42 is simultaneously utilized to capture hydrocarbons in the manner described above with reference to the bed 36. This is accomplished by simply reversing the operation of the valve pairs 32 and 33, 56 and 57, 38 and 44, and 39 and 45, respectively to control the flow through the vapor recovery system 12.

In accordance with an important aspect of the present invention, the absorber fluid return circuit 10 will now be reviewed in detail. As should be appreciated from viewing FIGS. 1 and 2, the absorber fluid return circuit 10 includes the return pump 64 with the drive motor 65, the first conduit 80 for connecting the inlet of the return pump to a discharge outlet of the absorber tower 60 and the second conduit 66 for connecting the outlet of the return pump to the absorber fluid source 16.

Additionally, the absorber fluid return circuit 10 also includes a means 82 for controlling the operating speed of the motor 65 in response to the level of absorber fluid contained in the absorber tower 60. Advantageously, the absorber fluid return circuit 10 effectively functions to maintain a relatively constant level of absorber fluid in the absorber tower 60. That level is a predetermined and desired level necessary to cause the absorber tower 60 to function at peak operating efficiency for the recovery of hydrocarbon vapor.

More specifically describing the invention, the controlling means 82 includes an absorber fluid level sensor 84, such as a Gems liquid level indicator and transmitter sold under the trademark SureSite as manufactured by IMD Industries, Inc. of Plainville, Conn. This device detects the level of absorber fluid in the absorber tower 60 by determining the position of the absorber tower meniscus in the sight glass (not shown) provided on the side of and external to the absorber tower. A controller 86 such as a dedicated microprocessor is responsive to the detected absorber level and operates through a means such as a variable speed AC drive 88 (such as manufactured by Telemecanique, a division of Square D, under the trademark ALTIVAR (Part No. ATV-16U72N4)) for varying the operating speed of the drive motor 65 by establishing the frequency of the electrical current provided from the electrical power source 90 (e.g. utility power line, electrical generator). In this way, the pumping capacity of the pump 64 is controlled. Thus, as the absorber fluid level detected in the absorber tower 60 rises, the frequency is increased to increase the speed of the motor 65 and, therefore, the pumping capacity of the pump 64. As the absorber fluid level detected in the absorber tower 60 falls, the current frequency is reduced to reduce the speed of the motor 65 thereby reducing the pumping capacity of the pump 64. Thus, the absorber fluid level may be maintained substantially constant at substantially all times at a level where maximum absorber tower operating efficiency is always insured. Further, consistent operation is always provided even in extreme temperature conditions. This is a particular advantage in northern climates where low temperatures often result in ice formation which adversely effects the consistent operation of state of the art float assemblies.

In summary, numerous benefits results from employing the concepts of the present invention. Advantageously, by means of the unique absorber fluid return circuit 10 described above, it is possible for the first time to continuously operate the absorber tower 60 at maximum efficiency. This is true regardless of climatic conditions including even the rapid temperature changes and temperature extremes often experienced in the upper Great Plains states. Further, the present absorber fluid return circuit 10 effectively eliminates the troublesome level control valve and float assembly commonly employed in prior state-of-the-art designs thereby significantly reducing maintenance requirements and downtime for repairs.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. In a volatile liquid vapor recovery system including at least one adsorbent bed, a vacuum pump for regenerating the bed, a heat exchanger for cooling the vacuum pump, an absorber tower for condensing volatile liquid vapor and an absorber fluid source, the improvement comprising:

an absorber fluid return circuit including:
 (a) an absorber fluid return pump having an inlet and an outlet;
 (b) a first conduit for connecting said inlet of said return pump to a discharge outlet of said absorber tower;
 (c) a second conduit for connecting said outlet of said return pump to said absorber fluid source;
 (d) a variable speed motor for driving said return pump; and
 (e) a controller and an absorber fluid level sensor external to said absorber tower for controlling the operating speed of said motor in response to a level of absorber fluid contained in said absorber tower so as to maintain a predetermined level of absorber fluid in said absorber tower in order to provide efficient operation thereof.

2. The absorber fluid return circuit set forth in claim 1, further including a variable speed AC drive for varying current frequency to said motor in response to the level of absorber fluid sensed in the absorber tower.

3. A volatile liquid vapor recovery system comprising:

at least one adsorbent bed;

a vacuum pump for regenerating said bed;

an absorber tower for condensing volatile liquid vapor;

an absorber fluid source;

an absorber fluid return pump for returning absorber fluid from said absorber fluid tower to said absorber fluid source;

a variable speed motor for driving said return pump; and a controller and an absorber fluid level sensor external to said absorber tower for controlling the operating speed of said motor in response to a level of absorber fluid contained in said absorber tower so as to maintain a predetermined level of absorber fluid in said absorber tower in order to provide efficient operation thereof.

4. The volatile liquid vapor recovery system set forth in claim 3, further including a variable speed AC drive for varying electrical power to said variable speed drive motor in response to the level of absorber fluid sensed in the absorber tower.

* * * * *